've# 3,053,850
REACTIVE PHTHALOCYANINE DYESTUFFS

Peter Frederick Clark and George Albert Gamlen, Manchester, England, assignors to Imperial Chemical Industries Limited, Millbank, London, England, a corporation of Great Britain
No Drawing. Filed Nov. 7, 1960, Ser. No. 67,474
Claims priority, application Great Britain Nov. 18, 1959
5 Claims. (Cl. 260—314.5)

This invention relates to new phthalocyanine dyestuffs and more particularly it relates to new water-soluble phthalocyanine dyestuffs which are valuable for colouring cellulose textile materials.

According to the invention there are provided the new phthalocyanine dyestuffs which, in the form of the free acids, are represented by the formula:

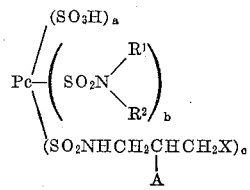

wherein Pc represents a phthalocyanine radical, $R^1$ and $R^2$ each represent a hydrogen atom or a hydrocarbon radical or a hydroxy substituted alkyl radical and may be the same or different or $R^1$ and $R^2$ together form with the nitrogen atom N a 5- or 6-metered heterocyclic ring, X represents a chlorine or a bromine atom, A represents a hydroxy group or a chlorine or a bromine atom, $a$ represents 0, 1 or 2, and $b$ and $c$ each represent 1, 2 or 3 and may be the same or different provided that $a+b+c$ does not exceed 4, and provided that when $a$ is 0 at least one of $R^1$ and $R^2$ is a hydrogen atom.

Each of the sulphonic acid and the substituted or unsubstituted sulphonamido groups present in the new dyestuffs, as hereinbefore defined, is directly attached to a carbon atom which is in the 3' or 4' position of the benz rings present in the phthalocyanine radical represented by Pc. The phthalocyanine radical Pc may be metal free but preferably it is a stable metal-containing phthalocyanine radical such as a cobalt phthalocyanine radical or a nickel phthalocyanine radical and above all a copper phthalocyanine radical.

As examples of the hydrocarbon radicals or hydroxy substituted alkyl radicals represented by $R^1$ and $R^2$ there may be mentioned alkyl radicals for example lower alkyl radicals such as methyl, ethyl, propyl and butyl, hydroxy lower alkyl radicals such as hydroxyethyl, $\beta$:$\gamma$-dihydroxypropyl, $\gamma$-hydroxypropyl and pentahydroxyhexyl, cycloalkyl radicals such as cyclohexyl, aralkyl radicals such as benzyl, and aryl radicals such as phenyl and naphthyl radicals.

As examples of the 5- or 6-membered heterocyclic rings which are formed by $R^1$, $R^2$ and the nitrogen atom N there may be mentioned morpholine, piperazine, piperidine and pyrrolidine.

According to a further feature of the invention there is provided a process for the manufacture of the new phthalocyanine dyestuffs, as hereinbefore defined, which comprises treating an aqueous suspension of a phthalocyanine sulphonchloride of the formula:

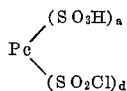

wherein Pc and $a$ have the meanings stated above and $d$ represents 1, 2, 3 or 4, provided that $a+d$ does not exceed 4, with a compound of the formula:

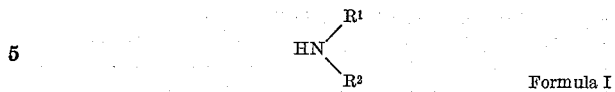

Formula I wherein $R^1$ and $R^2$ have the meanings stated above, and with a compound of the formula:

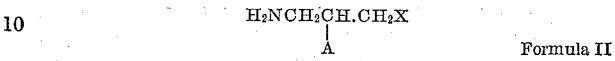

Formula II wherein A and X have the meanings stated above, and when $a$ is 0 optionally converting one or two of the sulphonchloride groups to a sulphonic acid group or groups.

The process of the invention may be conveniently brought about by adding the compound of Formula I or of Formula II or an aqueous solution thereof to the aqueous suspension of the phthalocyanine sulphonchloride, stirring the mixture, preferably at a temperature between 10° and 50° C. adding the other compound or an aqueous solution thereof, again stirring, perferably at a temperature of 10° to 50° C., to complete the reaction, whilst maintaining the pH of the mixture between 7 and 8 by the addition of an acid-binding agent, and when starting from a phthalocyanine sulphonchloride which does not also contain a sulphonic acid group optionally converting one or two of the sulphonchloride groups which have not been reacted with an amine to a sulphonic acid group by heating the mixture for a short time at a temperature between 50° C. and 60° C. whilst maintaining the pH between 7 and 8.

The hydrochloric acid which is liberated during the reaction is neutralised by adding an acid-binding agent such as sodium carbonate or alternatively an excess of the said compounds of Formula I and/or II can be used.

The amounts of the compounds of Formula I and of Formula II used in the process of the invention will depend on the number of the two different sulphonamido groups which are required in the final product. When it is required to subsequently convert one or two of the sulphonchloride groups to sulphonic acid groups then the amount of the said compounds used will be insufficient to cause complete conversion of all the sulphonchloride groups to sulphonamido groups.

At the conclusion of the process the precipitated dyestuff is filtered off, if necessary after first adding sodium chloride or an acid such as hydrochloric acid, and dried.

As examples of compounds of Formula I which may be used in the process of the invention there may be mentioned methylamine, ethylamine, $\beta$-hydroxyethylamine, cyclohexylamine, benzylamine, aniline, di-($\beta$-hydroxyethyl)amine and N-methyl-N-$\beta$-hydroxyethylamine, but the preferred compound of Formula I is ammonia.

As examples of compounds of Formula II which may be used in the process of the invention there may be mentioned $\gamma$-chloro-$\beta$-hydroxypropylamine, $\beta$:$\gamma$-dichloropropylamine, $\beta$:$\gamma$-dibromopropylamine and $\gamma$-bromo-$\beta$-hydroxypropylamine.

If desired the compounds of Formula II can be used in the form of their salts with hydrogen chloride or hydrogen bromide.

The phthalocyanine sulphonchlorides used in the process of the invention may be obtained by treating the corresponding phthalocyanine or phthalocyanine sulphonic acid with chlorosulphonic acid, if necessary in the presence of carbon tetrachloride or an acid halide such as thionyl chloride, sulphurylchloride, phosphorus pentachloride, phosphorus oxychloride and phosphorus trichloride, for example as described in British specifications Nos. 708,543, 784,843 and 785,629 and in United States specification No. 2,219,330.

The new dyestuffs, as hereinbefore defined, are valuable for colouring textile materials and in particular cellulose textile materials such as cotton, linen and viscose rayon. The new dyestuffs are preferably applied to textile materials in conjunction with a treatment with an acid-binding agent, which may be applied to the textile materials before, during or after the application of the dyestuffs. As examples of acid-binding agents there may be mentioned sodium carbonate, sodium hydroxide, sodium metasilicate and trisodium phosphate or there may be used substances, such as sodium bicarbonate and sodium trichloroacetate, which on heating liberate an acid-binding agent.

The new dyestuffs, as hereinbefore defined, may be applied to textile materials by a dyeing, padding or printing process. The aqueous solutions of the dyestuffs used for a dyeing or a padding process may contain any of the common dyebath adjuvants such as sodium chloride, sodium sulphate, sodium alginate, sodium dibenzylsulphanilate, urea and water-insoluble alkyl ethers of cellulose. When the dyestuffs are applied to the textile materials by a printing process then the print paste containing the dyestuff may contain any of the adjuvants which are normally added to print pastes such as urea, ethanol and sodium m-nitrobenzene sulphonate and thickening agents such as methyl cellulose, starch, locust bean gum, oil-in-water emulsions and water-in-oil emulsions but the preferred thickening agents for use with the new dyestuffs are alginates such as sodium alginate.

The new dyestuffs may also be used to colour natural proteins such as wool, silk and leather, and synthetic polyamides and polyacrylonitriles to give greenish-blue shades having a high fastness to washing by treating these materials in a weakly alkaline neutral or acid solution of the dyestuff. It is preferred to carry out the dyeing of wool in the presence of a cationic surface-active agent such as stearamido-methyl pyridinium chloride, cetyl pyridinium bromide or cetyl trimethylammonium bromide, and preferably also in the presence of a non-ionic surface-active agent such as the polycondensation products of ethylene oxide with fatty alcohols, alkyl phenols and long chain alkylamines.

The new dyestuffs, as hereinbefore defined, when applied to textile materials give bright greenish-blue colourations which have excellent fastness to light and to wet treatments such as washing, and the colourations obtained from the new dyestuffs are much stronger tinctorially and much less sensitive to the action of ultra-violet light than the colourations obtained from the corresponding dyestuffs which do not contain one or more

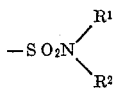

groups, as hereinbefore defined.

The invention is illustrated but not limited by the following examples in which the parts and percentages are by weight:

*Example 1*

23 parts of copper phthalocyanine are slowly added with stirring to 57 parts of chlorosulphonic acid and the mixture is then stirred for 3 hours at a temperature between 135° and 140° C. The mixture is cooled to 80° C., 6 parts of thionyl chloride are added and the mixture is then stirred for 3 hours at a temperature of 85° C. The mixture is cooled to 20° C., poured onto ice and the precipitated phthalocyanine sulphonchloride is filtered off and washed with 2000 parts of water containing ice.

The solid sulphonchloride so obtained is stirred with 500 parts of water and 200 parts of ice and the pH of the mixture is raised to 4 by the addition of a 35% aqueous solution of sodium hydroxide. 6 parts of a concentrated aqueous solution of ammonium hydroxide are then added followed by a solution of 7.8 parts of γ-chloro-β-hydroxypropylamine hydrochloride and 4 parts of a concentrated aqueous solution of ammonium hydroxide in 156 parts of water. The pH of the resultant mixture is adjusted to 8 by the addition of a 2 N aqueous solution of ammonium hydroxide and the temperature of the mixture is then raised to 40° C. during 1 hour and maintained at 40° C. for 15 hours, the pH of the mixture being maintained at 8 by further additions of a 2 N aqueous solution of ammonium hydroxide. The mixture so obtained is cooled to 20° C. and is acidified to pH 3 by the addition of a concentrated aqueous solution of hydrochloric acid. The precipitated dyestuff is then filtered off, washed with a 1% aqueous solution of hydrochloric acid and dried at 50° C.

When applied to cellulose textile materials by a printing process the dyestuff yields bright greenish-blue prints possessing excellent fastness to wet treatments and the prints so obtained are much stronger tinctorially than the prints obtained from the corresponding dyestuff which does not contain a sulphamyl group.

*Example 2*

23 parts of copper phthalocyanine are slowly added with stirring to 108 parts of chlorosulphonic acid and the mixture is then stirred for 3 hours at a temperature between 135° and 140° C. The mixture is then cooled to 80° C., 20 parts of thionyl chloride are added and the mixture is stirred for 3 hours at a temperature of 85° C. The mixture is cooled to 20° C., poured on to ice and the precipitated copper phthalocyanine tetra-3-sulphonchloride is filtered off and washed with 200 parts of a 1% aqueous solution of hydrochloric acid which has previously been cooled to 1° C.

The solid sulphonchloride so obtained is stirred with 200 parts of water and 120 parts of ice and the pH of the mixture is raised to 4 by the addition of a 35% aqueous solution of sodium hydroxide. 6 parts of a concentrated aqueous solution of ammonium hydroxide are then added followed by a solution of 7.8 parts of γ-chloro-β-hydroxypropylamine hydrochloride and 4 parts of a concentrated aqueous solution of ammonium hydroxide in 156 parts of water. The pH of the resulting mixture is adjusted to 8 by the addition of a 2 N aqueous solution of ammonium hydroxide and the temperature of the mixture is then raised to 50° C. during 1 hour and maintained at 50° C. for 1.5 hours, the pH of the mixture being maintained at 8 by further addition of a 2 N aqueous solution of ammonium hydroxide. The resulting mixture is then cooled to 20° C., and is acidified to pH 3 by the addition of a concentrated aqueous solution of hydrochloric acid. The precipitated dyestuff is then filtered off, washed with a 1% aqueous solution of hydrochloric acid and dried at 50° C.

When applied to cellulose textile materials by a printing process in conjunction with a treatment with an acid-binding agent the dyestuff yields bright greenish-blue prints possessing excellent fastness to wet treatments and the prints so obtained are much stronger tinctorially than the prints obtained from the corresponding dyestuff which does not contain a sulphamyl group.

In place of the 20 parts of thionyl chloride used in the above example there are used 11 parts of phosphorus trichloride which is added at a temperature of 95° C., when a similar dyestuff is obtained.

The following table gives further examples of the new dyestuffs of the invention which are obtained when the ammonium hydroxide used in Example 2 is replaced by equivalent amounts of the amines listed in the second column of the table, and/or the 7.8 parts of γ-chloro-β-hydroxypropylamine hydrochloride used in Example 2 are replaced by equivalent amounts of the hydrochlorides or hydrobromides of the halogenopropylamines listed in the third column of the table. The fourth column of the table indicates the temperature at which the reaction between the amines and the sulphonchloride was carried out.

All the dyestuffs gave greenish-blue colourations when applied to cellulose textile materials.

| Example | Amine | Halogenopropylamine | Temperature of Reaction, °C |
|---|---|---|---|
| 3 | β-hydroxyethylamine | γ-chloro-β-hydroxypropylamine | 50 |
| 4 | di(β-hydroxyethyl)amine | ___do___ | 50 |
| 5 | N-methylglucamine | ___do___ | 50 |
| 6 | ammonium hydroxide | 2:3-dichloropropylamine | 50 |
| 7 | ___do___ | 2:3-dibromopropylamine | 40 |
| 8 | ___do___ | γ-bromo-β-hydroxypropylamine | 25 |
| 9 | piperidine | γ-chloro-β-hydroxypropylamine | 50 |
| 10 | morpholine | 2:3-dichloropropylamine | 50 |
| 11 | methylamine | γ-chloro-β-hydroxypropylamine | 50 |
| 12 | dimethylamine | ___do___ | 50 |
| 13 | cyclohexylamine | ___do___ | 50 |
| 14 | benzylamine | ___do___ | 50 |

*Example 15*

In place of the copper phthalocyanine tetra-3-sulphonchloride used in Examples 2 to 14 there is used an equivalent amount of copper phthalocyanine tetra-4-sulphonchloride when similar dyestuffs are obtained.

The copper phthalocyanine tetra-4-sulphonchloride used in the above example may be obtained as follows:

39.4 parts of the tetrasodium salt of copper phthalocyanine-tetra-4-sulphonic acid are dissolved in 160 parts of chlorosulphonic acid and the resulting solution is stirred for 3 hours at a temperature between 115° and 120° C. The solution is then cooled to 80° C., 20.5 parts of thionyl chloride are added and the mixture is then stirred for further 3 hours at 115° to 120° C. The mixture is then cooled to 20° C., poured on to ice and the precipitated copper phthalocyanine tetra-4-sulphonchloride is filtered off and washed with 200 parts of a 1% aqueous solution of hydrochloric acid at a temperature of 1° C.

*Example 16*

In place of the 23 parts of copper phthalocyanine used in Example 2 there are used 22.8 parts of nickel phthalocyanine whereby a dyestuff is obtained which gives greenish-blue shades, greener and duller than the corresponding copper derivative but of comparable fastness properties, when applied to cellulose textile materials in conjunction with a treatment with an acid-binding agent.

*Example 17*

In place of the 23 parts of copper phthalocyanine used in Example 2 there are used 22.8 parts of cobalt phthalocyanine whereby a dyestuff is obtained which gives greenish-blue shades when applied to cellulose textile materials in conjunction with a treatment with an acid-binding agent.

*Example 18*

In place of the copper phthalocyanine tetra-3-sulphonchloride used in Examples 2 and 6 there is used an equivalent amount of copper phthalocyanine-3:4′:4″:4‴-tetrasulphonchloride when similar dyestuffs are obtained.

The copper phthalocyanine-3:4′:4″:4‴-tetrasulphonchloride used in the above example may be obtained as follows:

32.6 parts of copper phthalocyanine-4′:4″:4‴-tri-sulphonic acid are added to 147 parts of chlorosulphonic acid and the resulting mixture is stirred for 3 hours at a temperature between 135° and 140° C. The mixture is then cooled to 95° C., 19.85 parts of thionyl chloride are added, during 1 hour, below the surface of the mixture and the mixture is then stirred for 2 hours at 95° C. The mixture is then cooled to 20° C., poured on to ice and the precipitated copper phthalocyanine-tetra-3:4′:4″:4‴-sulphonchloride is filtered off and washed with a 1% aqueous solution of hydrochloric acid at a temperature of 1° C.

*Example 19*

23 parts of copper phthalocyanine are converted to the tetrasulphonchloride by the method described in the first paragraph of Example 2. The tetrasulphonchloride is stirred with 200 parts of water and 120 parts of ice and the pH of the mixture is raised to 4 by the addition of a 35% aqueous solution of sodium hydroxide. A solution of 7.8 parts of γ-chloro-β-hydroxypropylamine hydrochloride in 100 parts of water is added and aniline is then added until the pH of the mixture is between 7.0 and 7.4. The mixture is then heated to 40° C. during 1 hour and maintained at this temperature for 15 hours, further amounts of aniline being added as required to maintain the pH between 7.0 and 7.4. The mixture is then cooled at 20° C. and is acidified to pH 3 by the addition of a concentrated aqueous solution by hydrochloric acid. The precipitated dyestuff is then filtered off, washed with a 1% aqueous solution of hydrochloric acid and dried.

When applied to cellulose textile materials in conjunction with a treatment with an acid-binding agent the dyestuff yields bright greenish-blue colourations possessing excellent fastness to wet treatments.

What we claim is:

1. A compound of the formula:

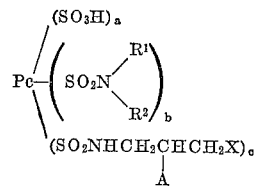

wherein Pc represents a member selected from the group consisting of metal-free phthalocyanine, copper phthalocyanine, cobalt phthalocyanine and nickel phthalocyanine, $R^1$ and $R^2$ each independently represent a member selected from the group consisting of hydrogen, lower alkyl, hydroxy lower alkyl, cyclohexyl, benzyl, phenyl and naphthyl and $R^1$ and $R^2$ together form with the nitrogen atom N a heterocyclic ring selected from the group consisting of morpholine, piperazine, piperidine and pyrrolidine; X represents a halogen selected from the group consisting of chlorine and a bromine atom, A represents a member selected from the group consisting of hydroxy, chlorine, and bromine, $a$ represents one of the numbers 0, 1, and 2, and $b$ and $c$ each represent one of the numbers 1, 2, and 3, provided that $a+b+c$ does not exceed 4, and provided that when $a$ is 0 at least one of $R^1$ and $R^2$ is a hydrogen atom.

2. A phthalocyanine dyestuff as claimed in claim 1 wherein $R^1$ and $R^2$ each represent a hydrogen atom.

3. A phthalocyanine dyestuff as claimed in claim 1 wherein X represents a chlorine atom and A represents a hydroxy group.

4. A phthalocyanine dyestuff as claimed in claim 1 wherein A and X each represent a chlorine atom.

5. A phthalocyanine dyestuff as claimed in claim 1 wherein the phthalocyanine radical represented by Pc is copper phthalocyanine.

References Cited in the file of this patent

UNITED STATES PATENTS

| | | |
|---|---|---|
| 2,072,062 | Wolfram et al. | Feb. 23, 1937 |
| 2,350,188 | Pinkney | May 30, 1944 |
| 2,761,868 | Lacey | Sept. 4, 1956 |
| 2,772,284 | Barnhart et al. | Nov. 27, 1956 |

OTHER REFERENCES

Colour Index, 2nd ed., 1956, Society of Dyers and Colourists vol. 2, p. 2201, entry C.I. 74180.
Ibid, vol. 3, p. 3570, entry C.I. 74180.